July 27, 1926.
S. SOLECKI
1,593,885
AUTOMOBILE VISOR
Filed Dec. 2, 1925
2 Sheets-Sheet 1
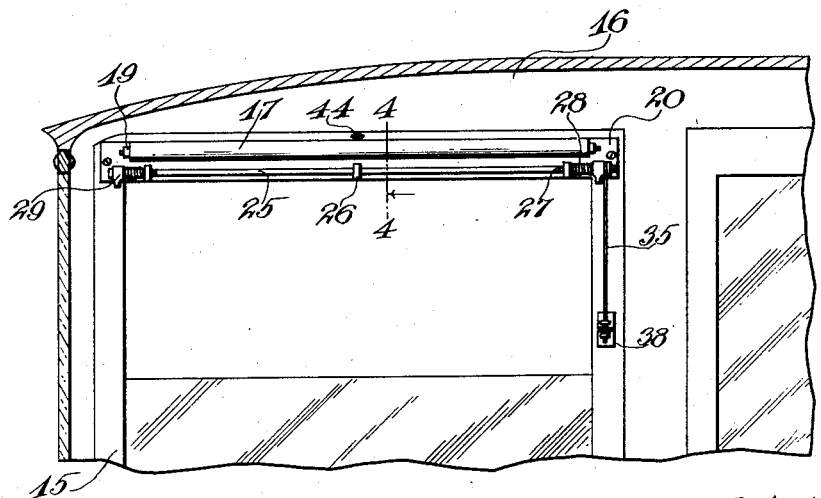
Fig. 1.
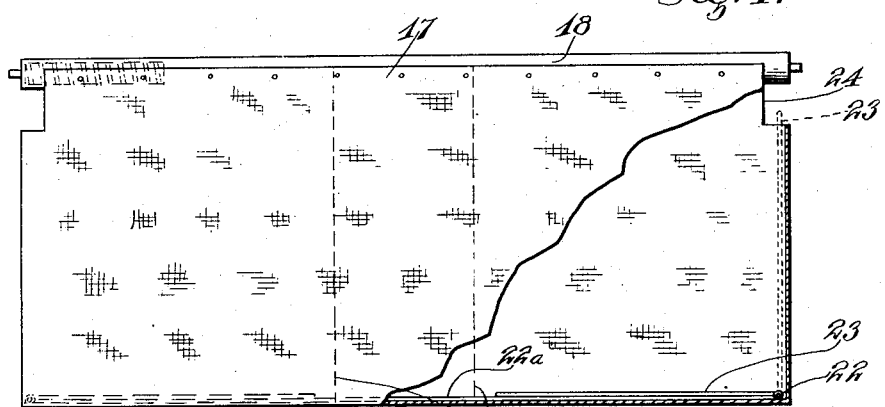
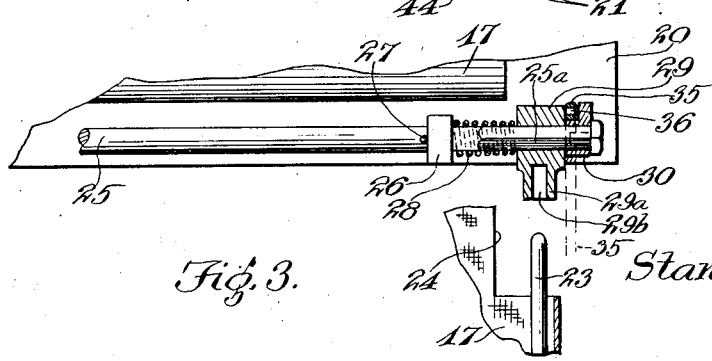
Fig. 2.
Fig. 3.
Stanley Solecki
Inventor.
Attorneys.

July 27, 1926.                     1,593,885
S. SOLECKI
AUTOMOBILE VISOR
Filed Dec. 2, 1925          2 Sheets-Sheet 2
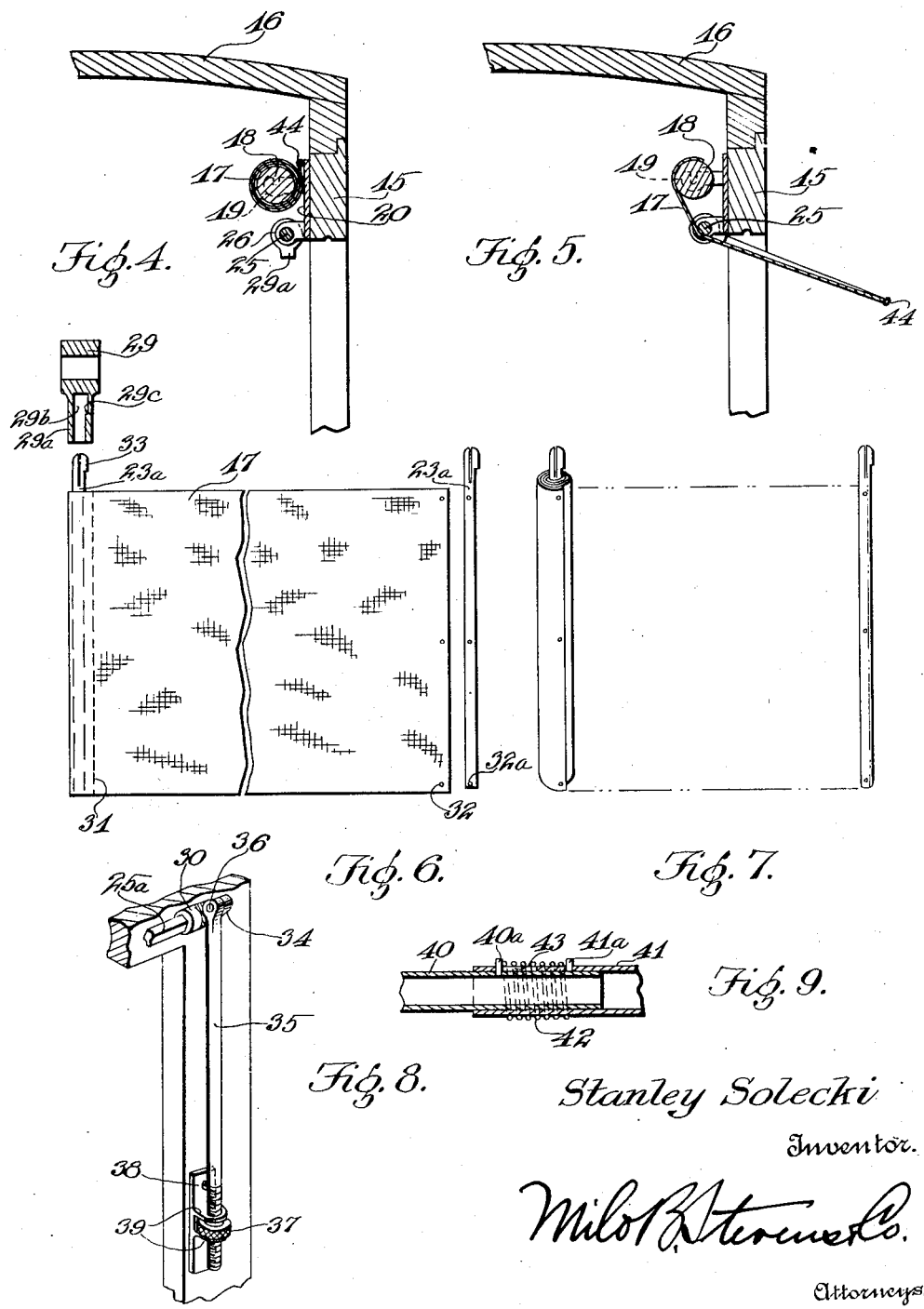
Stanley Solecki
Inventor.
Attorneys.

Patented July 27, 1926.

1,593,885

UNITED STATES PATENT OFFICE.

STANLEY SOLECKI, OF CHICAGO, ILLINOIS.

AUTOMOBILE VISOR.

Application filed December 2, 1925. Serial No. 72,774.

This invention relates to automobile visors as used in the nature of sun or rain shields, and its object is to provide a visor which is designed for use at the sides of the machine.

A further object of the invention is to mount the novel visor on the doors of closed vehicles as a unit and without interfering with the opening or closing thereof.

Another object of the invention is to so design the novel visor that it may occupy a minimum amount of space when not in use.

With the above objects in view, and such others as may suggest themselves from the description and claims to follow, a better understanding of the invention may be gained by reference to the accompanying drawing, in which—

Figure 1 is an elevation of the novel visor when not in use, as viewed from within a closed automobile, the latter being shown but in part;

Fig. 2 is an elevation of the visor extended and partly cut away, apart from its supporting element;

Fig. 3 is an enlarged showing, partly in section of a portion of Fig. 1;

Fig. 4 is a magnified section on the line 4—4 of Fig. 1;

Fig. 5 is a view similar to Fig. 4, showing the device in use;

Figs. 6 and 7 are views of modified shields to be referred to in more detail;

Fig. 8 is a perspective view of a controlling device; and

Fig. 9 is a section of a modified support.

Referring specifically to the drawings, 15 denotes one of the doors of a closed motor car 16 to which the invention is applied. In this connection it may be said that the invention is applied to any sight opening such as a window, equally well.

In applying the novel visor, the shield 17 is wrapped on a spring roller 18 of the type usually employed for window shades, the roller being hung in suitable bearings 19 projecting from a plate 20 fastened to the top rail of the door. In Figure 2 shows the shield unwrapped or extended from the roller, and it will be noted that its structure is in two thicknesses or sheets. The material of the shield may be canvas or any other fabric suitable for the purpose, and it is medially stitched as shown at 21 to keep in shape. The lower corners of the shield have secured therein rings 22 on the ends of a bottom wire rod 22ª to which are pivoted wire rods 23, these rods lying between the two sheets of the shield along the bottom edge thereof together with the bottom rod 22ª, whereby they do not interfere with the wrapping of the shield upon the roller 18. The top corners of the shield are cut away short of the roller, as shown at 24, whereby to expose the upper ends of the rods 23 when swung in the direction of the arrows to the position denoted by fine dotted lines.

The shield just described requires the cooperation of the novel supporting device illustrated in Figures 1 and 3. This device consists mainly of a horizontally positioned rod 25 loosely mounted in bearing lugs 26 carried by the door plate 20 below the site of the roller 18. By means of cross-pins 27 or other suitable means, the rod is arrested from longitudinal motion; and beyond its outer bearings 26 it is reduced to a squared cross-section—as suggested at 25ª in Figure 3—to first receive a compressible coil spring 28, next a slidable collar 29, next a smaller slidable collar 30, and finally an end-bolt to retain the collars on the reduction 25 against the expansive force of the spring 28. The collars 29 and 30 are situated opposite, or in front of, the door stiles, and the collar 29 has a downward extension 29ª into which a recess 29ᵇ is bored from the bottom. Now recalling the projecting wire rods 23 as described in connection with the shield 17, the fragmentary showing at the bottom of Figure 3 is indicative of the fact that the exposed ends of the wire rods 23 will enter and remain in the recesses 29ᵇ of the collar extensions 29ª as the spring roller 18 exerts an upward drawing influence upon the shield 17. However, in the application of the latter as suggested, it is found that the shield is of a width less than the sight opening of the door, while the collars 29 are spaced greater than that width by being opposite the door stiles; as previously mentioned. Therefore, to fit the shield, the two collars 29 and 30 are of necessity gathered against the tension of the respective springs 28 until the extension recesses 29ᵇ thereof register with the points of the wire rods 23. With the shield fitted, it will not only be so maintained by the pull of the spring roller, as previously mentioned, but the expansive tendency of the springs 28 will stretch the shield laterally to render the same flat and firm.

The position of a visor being external and inclined, the present invention has been designed to attain this end by the simple pivotal swing of the shield 17 in an outward direction after the glass sight in the door has been lowered, with the rod 25 as an axis. The manner in which the shield has been fitted permits it to easily clear the limits of the sight opening as swung outwardly to assume the position of a visor, as illustrated in Figure 5.

In the case of motor cars whose doors or windows have a very narrow top rail, the modifications of Figures 6 and 7 may be employed to adapt the novel visor to the situation. Thus, in these instances, the spring roller 18 is dispensed with and the shield separately carried in a wall or luggage compartment. Figure 6 shows a simple, single-sheet shield having a hem 31 at one end and a row of fasteners or clasps 32 at the other. The hem carries a wire rod 23$^a$—on the order of the former rod 23—the projecting end of this rod being however formed like a split latch-bolt 33. As shown in Figure 6, the recess 29$^b$ in the collar extension 29$^a$ is made with an undercut shoulder 29$^c$ to cause the rod ends 33 to snap and lock when fitted. With the hem-end of the shield thus supported, a companion rod 23$^a$ is similarly fitted at the opposite side of the door or window, and the two rods gathered as before to enable the fasteners 32 to to meet mates 32$^a$ on the right-hand rod 23$^a$ and secure the shield in flat and firm position. It will be obvious that to remove the shield assembly, but the rod ends 33 need be squeezed between the tips of the fingers to contract and loosen them from their supports.

The structure of Figure 7 is applicable in the same manner as that of Figure 6, and is intended for use where the front stile of the door or window has extra width. The left-hand or frontal rod 23$^a$ in this instance carries the shield wrapped on a spring roller, and the shield is drawn across the sight opening to fasten to the right-hand rod in the manner shown.

While the tension and friction of the springs 28 against the bearing lugs 26 ordinarily suffice to hold the visor at any angle to which set, the vibration incident to motor car travel requires that a more positive setting means be provided. A means for this purpose and also to vary the adjustment of the visor from a handy site is more clearly illustrated in Figure 8. It will be noted that the small collar 30 mounted at one end of the supporting rod 25 has a small radial arm 34 to which the upper end of a vertical rod 35 is pivotally attached by a pin 36. This rod depends to a position handily accessible and is there threaded to receive a knurled nut 37. The lower end of the rod is opposite a door-plate 38 and passes loosely through apertures in two lugs 39 projecting from said plate, the nut 37 occupying a position between the lugs. It will be seen that the rise or fall of the rod 35 will cause it to act as a crank lever to vary the inclination of the visor; and this action can be secured and controlled by manipulating the knurled nut 7 accordingly.

While the principle of the invention has been illustrated in the structures described, it will be obvious that the invention is susceptible of various changes and modifications without departing from its spirit or scope. Thus, the expansive property of the support to keep the shield of the visor stretched and firm may be attained by a modification such as shown in Figure 9. In this case, the rod 25 and terminal springs 28 may be replaced by telescoping tubes 40 and 41, carrying pins 40$^a$ and 41$^a$, respectively, and a coiled expansive spring 42 between the pins. With the pin 40$^a$ passing through a longitudinal slot 43 in the tube 41, a separating limit for the tubes is provided.

A visor is thus had which is simple and efficient and may be operated without skill.

A suitable finger piece 44 may be used to draw the shield 17 from the roller 18, such finger piece also serving as a stop, per Fig. 4, to prevent the spinning of the roller after the shield is fully wrapped thereon.

I claim:—

1. A visor for door or window frames comprising a plate at the top of the frame, a spring roller mounted on the plate, a shield wrapped on the roller, and of a width less than the frame opening, a pivotal support mounted on the plate below the roller, means carried by the shield and the support and co-operating to attach the shield to the latter, and means incident to said attachment to draw the shield taut.

2. A visor for door or window frames comprising a plate at the top of the frame, a spring roller mounted on the plate, a shield wrapped on the roller, and of a width less than the frame opening, a pivotal support mounted on the plate below the roller, means carried by the shield and the support and co-operating to attach the shield to the latter, and means incident to said attachment for checking the swing of the shield.

3. A visor for door or window frames comprising a plate at the top of the frame, a spring roller mounted on the plate, a shield wrapped on the roller, and of a width less than the frame opening, a pivotal support mounted on the plate below the roller, form-lending rods carried by the shield, sockets carried by the support to receive the rods by force of the pull of the spring roller on the shield, and springs operative to separate the sockets and thereby draw the shield taut.

4. A visor for door or window frames comprising a plate at the top of the frame, a spring roller mounted on the plate, a shield wrapped on the roller, a pivotal support mounted on the plate below the roller, form-lending rods carried by the shield, sockets carried by the support to receive the rods by force of the pull of the spring roller on the shield and springs operative to separate the sockets and thereby draw the shield taut, and manual means for controlling the pivotal swing of the shield.

5. A visor comprising a roller, a shield trained about the roller, a shaft extending substantially parallel to the roller, arms having connection with the shaft and adapted for engagement with the shield, and means whereby the shaft may be rocked to swing the arms outwardly and thereby engage the shield with the shaft for tensioning the shield.

6. A visor comprising a shield of flexible material, laterally spaced rods carried by the shield and projecting from the top thereof, a pivotal support above the shield, sockets carried by said supports and adapted to receive the projecting ends of said rods, and springs operative to separate the sockets and thereby draw the shield taut.

In testimony whereof I affix my signature.

STANLEY SOLECKI.